UNITED STATES PATENT OFFICE.

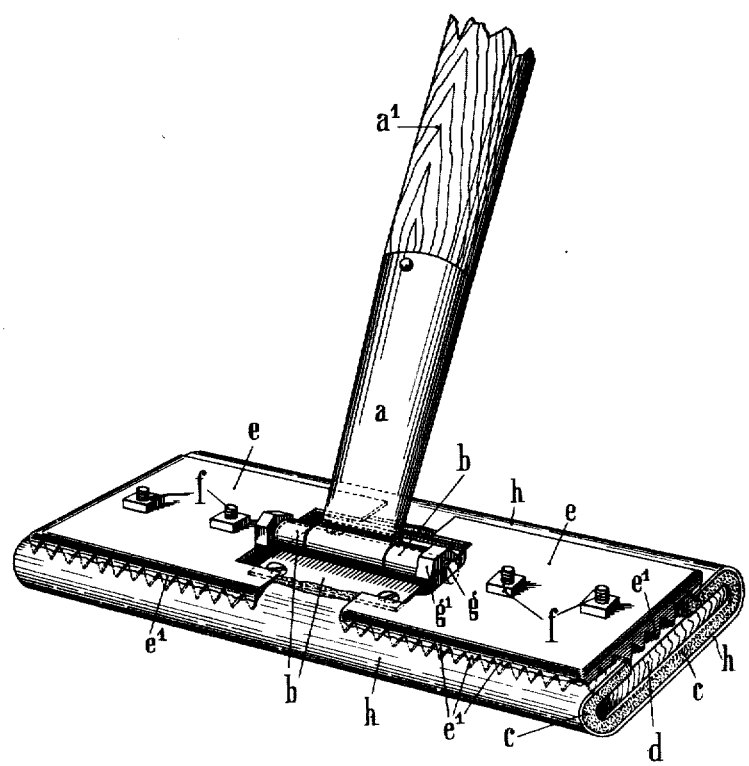

ARNOLD MOSEKE, OF MINDEN, GERMANY.

WIPER.

No. 916,755.  Specification of Letters Patent.  Patented March 30, 1909.

Application filed August 9, 1907. Serial No. 387,879.

*To all whom it may concern:*

Be it known that I, ARNOLD MOSEKE, a subject of the German Emperor, residing at Minden, Province of Westphalia, in the Empire of Germany, have invented a certain new and useful Wiper, of which the following is a specification.

This invention has reference to a device for the wiping of floors, window panes and the like, in which the wiping cloth is secured, together with a piece of felt, upon that side of the wiping plate which faces the surface to be operated upon by means of indented plates after it has been placed around the wiping plate. The piece of felt or of similar material is intended to serve for the purpose of providing a soft support and a firm hold for the wiping cloth to be placed around the felt, and also for the purpose of protecting it against rapid wear.

The figure is a perspective view of a wiper embodying my invention.

In consequence of its comparatively small size and of its very small height, which is brought about in consequence of the use of clamping plates, the wiper is particularly adapted to be employed for the wiping of floors under lounges or other pieces of furniture. With this purpose in view, the attachment of the handle to the wiper is such, that the handle may assume any position in one plane relative to the wiper that may be called for.

As will be seen from the accompanying drawing, the wiper consists of a plate $d$ of wood or of any other suitable material around which a piece of felt or of any other soft material $c$ is placed. After placing a wiping cloth around this soft support one or two clamping plates $e$ provided with indentations $e'$ and perforations for the insertion of screws, are placed upon the support of felt or of other soft material and upon the wiping cloth $h$ folded around it, at the side which does not form the operating surface, the said plates being clamped against the wooden plate together with the wiping cloth and the support of felt or the like, by means of screws $f$ provided in the wooden plate and by the tightening of the corresponding nuts.

In order to be able to use the handle $a'$ in every position relatively to the operating surface, it is provided at its end with a handle holder $a$, at the end of which an eye is provided. On the wooden plate $d$ corresponding eyes or sleeves $b$ are secured, which constitute a hinge together with the eye or sleeve of the handle holder, through which a bolt $g$ with nut $g'$ is passed, so as to make it possible thereby to permit the handle holder or socket to assume any position in one plane relatively to the wiper.

I am aware that wipers, having wooden supporting plates with hinged, pivoted handles and serving as a means for securing thereto a wiping cloth have been known before my invention, but in all these devices the wiping cloth was not passed directly around the supporting plate, but around a combination of supporting plate and an intermediate piece of thick felt or the like, secured to the bottom of said plate, the cloth being fastened to the back of the supporting plate and adhering only to the bottom part of the device, while at the longitudinal sides of said device, the supporting plate and the intermediate piece of felt or the like were not covered by the wiping cloth which was only drawn taut over the outer edges of said plate and layer of felt, being otherwise exposed on both sides, so that when operating with such devices, the cloth worked loose easily and interfered with the wiping operation and was liable to get torn. In my invention however the cloth $c$ covers the supporting plate smoothly and snugly on all sides, so as to be exposed on its outside only and preventing loosening during the wiping operation; nor is there any necessity of a resilient intermediate pad as in previous devices.

What I claim as my invention and desire to secure by Letters Patent is.—

In a wiper the combination with a wooden supporting plate and a handle, pivoted to the back of said plate, of a thick felted fabric snugly, removably and directly adhering to the outer face, to the longitudinal edges and faces and to a sufficient part of the back of said supporting plate, clamping plates, removably secured to the back of said supporting plate and covering the free edges of said fabric and indentations upon the fabric covering and facing sides of said clamping plates.

In testimony whereof I have hereunto signed my name to this specification in the presence of two subscribing witnesses.

ARNOLD MOSEKE.

Witnesses:
LOUIS VANDORN,
M. KNEPPERS.